United States Patent
Pintaux

(10) Patent No.: US 9,892,240 B2
(45) Date of Patent: Feb. 13, 2018

(54) SYSTEM AND METHOD FOR PROVIDING A CONTENT CONSUMPTION JOURNAL TO USERS IN A MULTI-DEVICE ENVIRONMENT

(71) Applicant: TELEFONAKTIEBOLAGET L M ERICSSON (PUBL), Stockholm (SE)

(72) Inventor: Nicolas Pintaux, Boulogne-Billancourt (FR)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 55 days.

(21) Appl. No.: 14/676,232

(22) Filed: Apr. 1, 2015

(65) Prior Publication Data
US 2016/0292395 A1    Oct. 6, 2016

(51) Int. Cl.
*G06F 21/00*        (2013.01)
*H04L 29/06*        (2006.01)
(Continued)

(52) U.S. Cl.
CPC .......... *G06F 21/10* (2013.01); *G06F 21/6218* (2013.01); *H04N 21/2358* (2013.01); *H04N 21/2393* (2013.01); *H04N 21/25891* (2013.01); *H04N 21/44204* (2013.01); *H04N 21/44222* (2013.01); *H04N 21/4821* (2013.01); *H04N 21/6582* (2013.01)

(58) Field of Classification Search
CPC . G06F 21/10; G06F 21/6218; H04N 21/6582; H04N 21/4821; H04N 21/2358; H04N 21/44222; H04N 21/44204; H04N 21/2393; H04N 21/25891
See application file for complete search history.

(56) References Cited

U.S. PATENT DOCUMENTS

| | | | |
|---|---|---|---|
| 2010/0262986 A1 | 10/2010 | Adimatyam et al. | |
| 2011/0270836 A1* | 11/2011 | Yang | G06Q 10/10 707/737 |

(Continued)

FOREIGN PATENT DOCUMENTS

| | | | | |
|---|---|---|---|---|
| EP | 1 848 213 A1 | 10/2007 | | |
| EP | 2587756 A1 * | 5/2013 | ............. | H04L 63/06 |
| EP | 2 690 878 A1 | 1/2014 | | |

OTHER PUBLICATIONS

David Mehrzadi, Dror G. Feitelson; "On extracting session data from activity logs"; Jun. 2012; SYSTOR '12: Proceedings of the 5th Annual International Systems and Storage Conference; Publisher: ACM; pp. 1-7.*

*Primary Examiner* — Kambiz Zand
*Assistant Examiner* — Courtney Fields

(57) ABSTRACT

A system and method for providing content consumption data to users in a multi-device environment. Activity data from a plurality of UE devices associated with a subscriber account are obtained when one or more users tied to the subscriber account consume content on one or more UE devices. The activity data may be correlated with one or more pieces of information relating to the consumed content. When a journal request is received from a user operating a UE device associated with the subscriber account, a response is generated containing data for presentation in a journal format that includes correlated subscriber activity data for the subscriber account over a select period of time.

18 Claims, 6 Drawing Sheets

(51) Int. Cl.
*G06F 21/10* (2013.01)
*G06F 21/62* (2013.01)
*H04N 21/235* (2011.01)
*H04N 21/239* (2011.01)
*H04N 21/258* (2011.01)
*H04N 21/442* (2011.01)
*H04N 21/482* (2011.01)
*H04N 21/658* (2011.01)
*H04L 9/32* (2006.01)

(56) References Cited

U.S. PATENT DOCUMENTS

| | | | |
|---|---|---|---|
| 2012/0084801 A1* | 4/2012 | Rowe | H04N 21/252 |
| | | | 725/14 |
| 2015/0074705 A1 | 3/2015 | Rumreich | |
| 2015/0089521 A1* | 3/2015 | Orlowski | H04N 21/44222 |
| | | | 725/14 |

* cited by examiner

SYSTEM AND METHOD FOR PROVIDING A CONTENT CONSUMPTION JOURNAL TO USERS IN A MULTI-DEVICE ENVIRONMENT

FIELD OF THE DISCLOSURE

The present disclosure generally relates to communication networks. More particularly, and not by way of any limitation, the present disclosure is directed to a system and method for providing a content consumption journal to users in a multi-device environment.

BACKGROUND

Television operators currently provide several services to end users to help them "catch up" with past shows aired on different channels. This type of service bears several different names, such as "Catch-up TV", "Live-to-VOD", "Start-over TV" or time-shift. Users typically have to browse through one or several content portals in order to find the content they are interested in. Alternatively, in the case of "time-shift", the users can browse the guide backwards. The content portals can be authored by the content providers themselves, or by the operators, depending on business agreements between the two parties. A "search" feature is typically made available on each portal, and the operator can also provide a cross-portal search functionality.

SUMMARY

The present patent disclosure is broadly directed to systems, methods, apparatuses, devices, and associated non-transitory computer-readable media for facilitating delivery of content consumption data to users in a multi-device environment. Preferably, the content consumption data may be provided in a journal format that not only indicates content consumed on different devices but also highlights any content that is subject to playback restrictions. In an example embodiment, activity data from a plurality of UE devices associated with a subscriber account are obtained when one or more users indexed to the subscriber account consume content on one or more UE devices. The activity data may be correlated with one or more pieces of information relating to the consumed content. When a journal request is received from a user operating a UE device associated with the subscriber account, a response is generated containing data for presentation in a journal format that includes correlated subscriber activity data for the subscriber account over a select period of time.

In another aspect, an embodiment of a method operating at a journal application server node is disclosed. The claimed embodiment comprises, inter alia, receiving a journal request from a user operating a UE device associated with a subscriber account, wherein the journal request includes at least one of an account identity (ID), a user ID and a UE device ID. Responsive to the journal request, appropriate service logic executing at the server node is operative to interrogate a subscriber activity database to obtain journal data for the subscriber account over a select period of time, wherein the journal data is based on activity data obtained from a plurality of UE devices associated with the subscriber account when one or more users consume content on the UE devices and correlated with one or more pieces of information relating to the consumed content. Thereafter, the server node is operative to provide the journal data to the user for presentation at the UE device in a format for facilitating navigation by the user.

In still further aspects, one or more embodiments of a non-transitory computer-readable medium containing computer-executable program instructions or code portions stored thereon are disclosed for performing one or more embodiments of the methods and/or service logic set herein when executed by a processor entity of a network node in conjunction with executable code in a nonvolatile memory. Additional features of the various embodiments are as claimed in the dependent claims.

Advantages of the present invention include, but not limited to, the capability to provide a better user experience and minimizing the time that users spend in trying to find content they may have liked before. In a multi-screen environment, where it is also difficult to find catch-up shows on a device-by-device basis, embodiments herein provide a consumption journal that displays a common set of information on all screens, thereby allowing the user to quickly find the shows she is interested in re-starting. From an operator perspective, helping users find the right content more rapidly will help refine the user opinions, recommendations, etc. that can facilitate higher level analytics or metrics regarding content consumption. If a show is watched more than once, then the weight of the show in a recommendation algorithm can be appropriated increased, for example. It should be appreciated that in today's solutions, a lot of people give up re-watching content because they simply can no longer find it. Another advantage of the present invention is that example embodiments herein can be implemented in user-centric configurations. For example, the playback activity can be tracked across devices for specific users. By way of illustration, a new service may be created to allow parents to verify how much time their kids have been watching TV (on any device), and what they actually watched.

Accordingly, without any admission, prejudice or other limitation, embodiments of the present patent application can advantageously overcome or mitigate one or more of the following issues. Although the current solutions provide access to a catalog of past shows, it can be difficult for the users to find content that they had previously started to watch, or quickly browsed through. For example, if a user wanted to watch a past program again, she would need to: remember the name of the program and do a wide search for it across all catalogs of catch-up content, or remember the name of the channel on which she watched the program, and then find the appropriate program in the catch-up catalog, or in the backwards guide navigation. Besides the fact that it can be difficult to remember the name of specific programs, the portals do not provide an indication whether a program is actually not listed in the catalog because of restrictive content rights. The user can therefore spend a fair amount of time browsing catch-up catalogs without ever finding the content they want to watch again. Further, user activity is typically recorded on the devices themselves, and uploaded to servers when resources allow. It is therefore very difficult for a user to re-play a show that was previously watched on TV on any other device without searching through the content portals of the device.

Additional benefits and advantages of the embodiments will be apparent in view of the following description and accompanying Figures.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

DETAILED DESCRIPTION OF THE DRAWINGS

Figure 1:
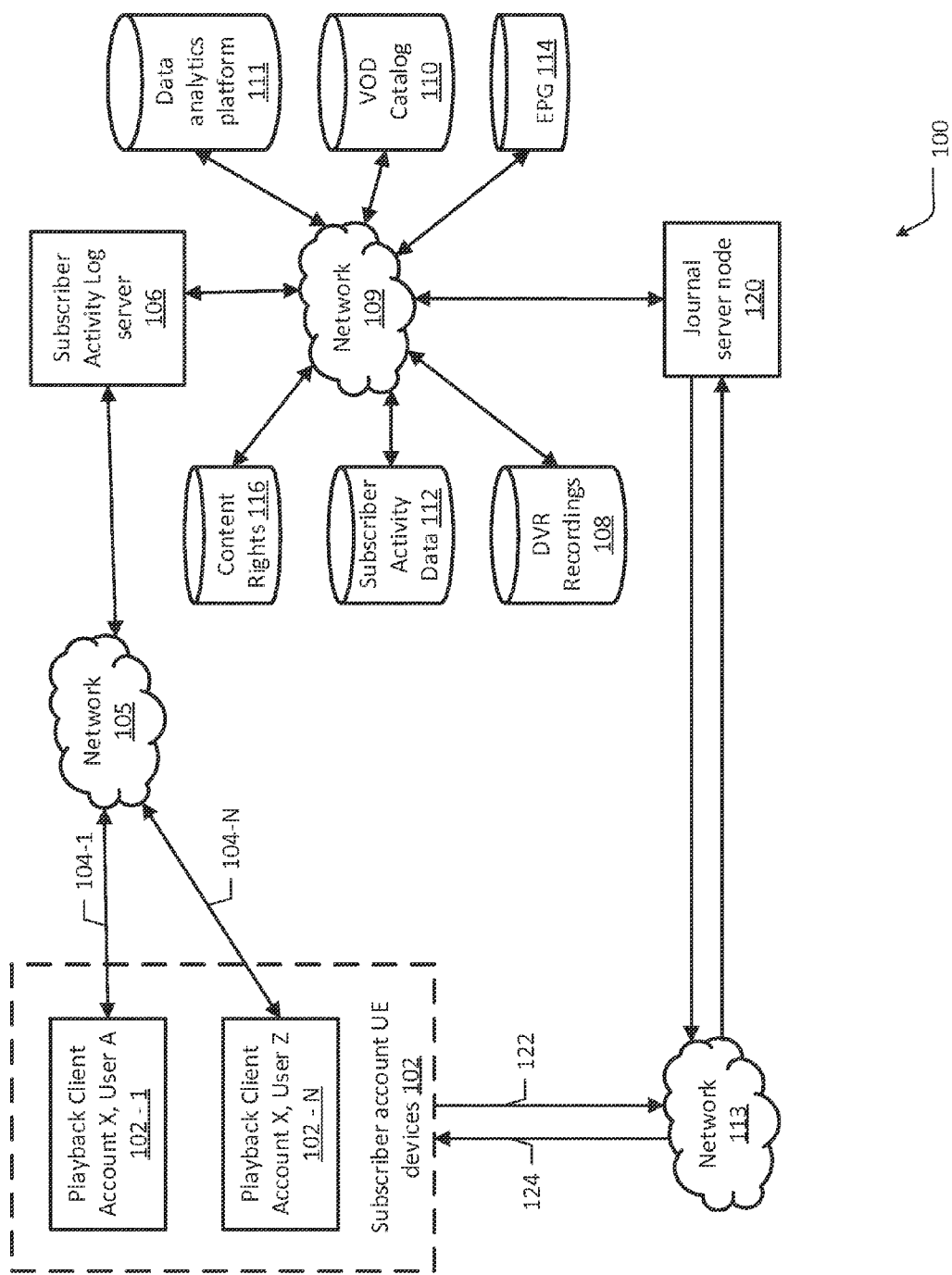
FIG. 1 depicts an example network architecture wherein an embodiment of the present patent application may be practiced for providing content consumption data in a journal format to one or more users.

In the following description, numerous specific details are set forth with respect to one or more embodiments of the present patent disclosure. However, it should be understood that one or more embodiments may be practiced without such specific details. In other instances, well-known circuits, subsystems, components, structures and techniques have not been shown in detail in order not to obscure the understanding of the example embodiments. Accordingly, it will be appreciated by one skilled in the art that the embodiments of the present disclosure may be practiced without such specific components. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element is capable of performing or otherwise structurally arranged to perform that function.

As used herein, a network element or node may be comprised of one or more pieces of service network equipment, including hardware and software that communicatively interconnects other equipment on a network (e.g., other network elements, end stations, etc.), and is adapted to host one or more applications or services with respect to one or more subscribers. As such, some network elements may be disposed in a wireless/wireline telecommunications network or a cable provider network whereas other network elements may be disposed in a public packet-switched network infrastructure (e.g., the Internet or worldwide web, also sometimes referred to as the Cloud), private packet-switched network infrastructures such as Intranets and enterprise networks, as well as service provider network infrastructures, any of which may span or involve a variety of access networks and core networks in a hierarchical arrangement. Where digital content or assets are consumed by the subscribers, network elements hosting such digital content or assets may be disposed in suitable content delivery network (CDN) infrastructures. Accordingly, some network elements may comprise "multiple services network elements" that provide support for multiple network-based functions (e.g., media delivery policy management, session control, Quality of Service (QoS) policy enforcement, content provider priority policy management, and the like), in addition to providing support for multiple application services (e.g., data and multimedia applications). Example subscriber end stations or user equipment (UE) clients or devices may comprise any device that users may use for receiving, playing back, browsing, or otherwise consuming content or information from a source, local or networked. In general, the terms "content" or "content file" as used in reference to at least some embodiments of the present patent disclosure may include digital assets and program assets such as any type of audio/video (NV) content or program segment, live streaming or static (e.g., recorded over-the-air free network TV shows or programs, pay TV broadcast programs via cable networks or satellite networks, free-to-air satellite TV shows, IPTV programs, etc.), Over-The-Top (OTT) and Video-on-Demand (VOD) or Movie-on-Demand (MOD) shows or programs, time-shifted TV (TSTV) content, locally stored content or network-stored content, as well as other content assets provided by content publishers, owners or providers, including but not limited to software files, executable computer code or programs, online electronic games, Internet radio shows/programs, entertainment programs, educational programs, movies, music video programs, and the like. Further, the content may be delivered, received or provided to the UE devices using broadcast cable TV, local TV, switched digital video (SDV) TV, satellite TV, broadband Internet, as well as via one or more adaptive bitrate (ABR) streaming technologies, e.g., Microsoft® Silverlight® Smooth Streaming, HTTP streaming (for instance, Dynamic Adaptive Streaming over HTTP or DASH, HTTP Live Streaming or HLS, HTTP Dynamic Streaming or HDS), Icecast, and so on. End station UE devices may therefore include TVs, set-top boxes (STBs) with or without integrated cable cards, personal/digital video recorders (PVR/DVRs), networked media projectors, desktop computers, laptops, netbooks, palm tops, tablets, smartphones, phablets, mobile/wireless user equipment, streaming media players, portable/video gaming systems or consoles (such as the Wii®, Play Station 3®, etc.), networked home entertainment systems, Internet appliances, and the like that are configured to access or consume content/services provided via a suitable network.

One or more embodiments of the present patent disclosure may be implemented using different combinations of software, firmware, and/or hardware. Thus, one or more of the techniques shown in the Figures (e.g., flowcharts) may be implemented using code and data stored and executed on one or more electronic devices or nodes (e.g., a subscriber client device or end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present disclosure.

Referring now to the drawings and more particularly to FIG. 1, depicted therein is an example network architecture 100 wherein an embodiment of the present patent application may be practiced for providing content consumption data in a journal format to one or more users. One or more UE devices 102-1 to 102-N associated with a subscriber account 102 are exemplified that can consume content from a variety of sources (not specifically shown) using any of the technologies set forth above. In an exemplary implementation, one or more users (e.g., members of a household) may be associated with the subscriber account which may be established in the name of a master user (e.g., household account owner) for purposes of a content consumption journal service as will be described below. A subscriber activity log server node 106 is operative to obtain various pieces of information from the UE devices 102-1 to 102-N whenever one or more users associated with the subscriber account consume content using a UE device, e.g., watch programs from local/cable/satellite TV, play back local DVR or NPVR content, stream videos/movies from online content providers such as Hulu®, Netflix®, YouTube®, or Amazon® Prime, etc., browse the Internet, and engage in online gaming, social media, as well as content browsing activities (such as, e.g., browsing, searching, displaying program information pages, etc.), and the like. Such subscriber activity data and one or more pieces of information relating to the content consumed by the one or more users associated with the subscriber account may comprise at least one of an account identity (ID), user identities (IDs) of users associated with the subscriber account, device identities (IDs) of the UE devices, TV channel tuning information including channel ID and tuning time, VOD/MOD asset identity (ID) information, video quality information (e.g., e.g., Standard Definition (SD), High Definition (HD), Ultra HD, 4K, etc.), content asset purchase pricing information, VOD asset playback start time, VOD asset playback end time, VOD asset playback status information, NPVR or DVR content identity (ID), NPVR/DVR content playback time, NPVR/DVR content playback end time, trick mode information, parental control information including personal identification number (PIN) associated with a master user designated as a subscriber account holder of the subscriber account, Internet browsing information including web page location information, streaming program identity (ID), user browsing navigation information, and power state information pertaining to the UE devices, device capability information, etc.

In one embodiment, at least a portion of the activity data may be periodically pushed or uploaded by the UE devices to the activity log server 106. In another embodiment, the activity log server 106 may periodically poll the UE devices to pull or retrieve some of the activity data. In a further embodiment, the UE devices may be configured to push the activity data in real time when a user engages in content consuming activity on that particular device. In a still further variation, some UE devices may have a user interface that is implemented or otherwise hosted in the Cloud, wherein user activity data may be already available on the network that can be accessed by the activity logger 106 using pushing and/or pulling operations, or other notification-based services. Additionally, appropriate Cloud-based notification servers or collection services may be employed in order to facilitate transferring of subscriber activity data as a web service. One skilled in the art will appreciate that the UE devices 102-1 to 102-N may be provided with various modes of network connectivity, e.g., WiFi, cellular, wireline, broadband, etc., including appropriate interfaces for facilitating transfer of activity data to the subscriber activity log server 106. Moreover, it should be realized that the UE devices do not necessarily need to operate on the same network infrastructures. For instance, a content journal application could be launched from a UE device when on the home network as well as when on a PC from the office or some other location. Accordingly, communication paths 104-1 to 104-N and associated network 105 should be deemed to be illustrative of all such variations and implementations in the example network architecture 100 shown in FIG. 1.

In accordance with the teachings herein, a "Big Data" analytics service platform 111 disposed in a network 109 is operative to correlate or otherwise manipulate the logged activity data in conjunction with one or more pieces of information relating to the consumed content to create appropriate records of data that may be indexed by subscriber accounts, users and devices, or in any permutation and combination thereof within a subscriber account, that may be suitably stored in the Cloud, e.g., subscriber activity database 112. For facilitating such correlated subscriber activity data, the analytics service platform 111 is operative to interface with various content-related databases such as DVR/NPVR recordings 108, VOD/MOD catalogs 110, one or more Electronic Program Guides (EPG) 114, as well as applicable content rights management entities 116 that may enforce any Digital Rights Management (DRM) constraints or restrictions with respect to the consumed content. Additionally, the analytics service platform 111 may also interface with subscriber/device policy profiles, content provider policy management services, etc. (not specifically shown in FIG. 1) in determining, at least in part, how to present content consumption data in a configurable journal format for a particular user or subscriber.

For purposes of the present application, "Big Data" may be used as a term for a collection of data sets so large and complex that it becomes virtually impossible to process using conventional database management tools or traditional data processing applications in a scalable manner. Challenges involving Big Data may include capture, curation, storage, search, sharing, transfer, analysis, and visualization, etc. Because Big Data available with respect to user activity data can be on the order of several terabytes to petabytes to exabytes depending on the number of subscriber accounts, associated users and UE devices as well as the vast number of available content sources, it becomes exceedingly difficult to work with using most relational database management systems for optimizing, ranking, correlating and indexing activity data in typical environments. In one embodiment, the analytics service platform 111 may be implemented as a programming model framework for processing and generating large data sets with a parallel, distributed algorithmic engine that may be executed in a "massively parallel processing" (MPP) architecture with software running on a large number of servers (e.g., a server farm). For example, a MapReduce programming platform may be configured as an implementation of the analytics service platform 111 for analyzing and correlating the subscriber activity data. As is known, a MapReduce programming platform comprises a Map( ) procedure engine for performing filtering and sorting operations and a Reduce( ) procedure engine that performs a summarizing operation, which operations may be distributed and executed in parallel on various loosely-coupled or distributed hardware/processor nodes. In one example configuration, the various databases set forth above and associated MapReduce programming platform may be implemented in an open-source software framework such as, e.g., Apache Hadoop, that is optimized for storage and large-scale processing of data sets on clusters of commodity hardware. In a Hadoop-based implementation, the software framework may comprise a common set of libraries and utilities needed by other modules, a distributed file system (DFS) that stores data on commodity machines configured to provide a high aggregate bandwidth across the cluster, a resource-management platform responsible for managing compute resources in the clusters and using them in the execution of MapReduce-based programming model. Broadly, an example MapReduce programming platform may include an Input reader component, a Map function component, a partition function component, a compare function component, a Reduce function component and an Output writer component, configured to interoperate with various network elements and/or database nodes of the example architecture 100.

Continuing to refer to FIG. 1, a journal application (JAPP) server node 120 is operative to receive requests (referred to as "journal requests") from one or more users 102-1 to 102-N that may be generated when a user wishes to consult a customizable and dynamically-updatable content consumption journal associated with the subscriber account. Preferably, a journal request may include at least one of an account ID, a user ID, and a UE device ID. In one variation, a journal request may also include additional parameters or variables such as a configurable time period for which the user wishes to see the subscriber activity (e.g., including "past subscriber activity" for a set time window), device filtering (e.g., extracting subscriber activity for one or more select UE devices), user filtering (e.g., a master user wishing to extract subscriber activity for a subset of users), content filtering (e.g., extracting subscriber activity for a certain type of content such as TV programming, VOD, NPVR/DVR, etc.), and the like. In another variation, a journal request may not specify a particular time window. In such a scenario, the JAPP server node 120 may provide journal data over a select period of time that is most recent (e.g., for the last 2 hours, 4 hours, 1 day, etc.) depending on configuration and/or user profiles. One skilled in the art will recognize that there can be various additional or alternative implementations for personalizing or configuring journal requests including specifying the presentation format, etc., that may be practiced within the scope of the present patent application.

It should be appreciated that although FIG. 1 shows the analytics service platform 111 as a separate entity, such a platform may be disposed at different locations in the network, or distributed across multiple network elements, or otherwise co-located or integrated with another network element (for example, including but not limited to, subscriber activity database 112, activity log server node 106, or JAPP server node 120). Regardless of implementation, the analytics service platform 111 may be executed periodically (e.g., batch mode) in one example embodiment to analyze and index the subscriber activity data records in database 112, prior to receiving a journal request, which may be accessed by the JAPP server node 120 upon receiving a request. In another arrangement, the analytics service platform 111 may be executed in real time responsive to receiving a journal request by the JAPP server node 120. Accordingly, it will be realized that an implementation of the architecture 100 may distinguish between "past" activities and the almost "real time" activities for including in a journal. With respect to past activities, an embodiment of the system could generate correlated subscriber activity records ahead of time to be retrieved by the user based on a journal request, in which case the MapReduce engine may be executed as a batch job. While the correlated subscriber activity data is readily available in such a scenario, such timeliness comes at a cost because of the need to process, analyze and correlate the activity data for all users and store the processed records. For real time activities, an embodiment of the system (e.g., comprising JAPP server 120, analytics service platform 111 and activity log server 106, among others) may be configured to execute the MapReduce engine on demand in order to generate the correlated subscriber activity data records on the fly (to take into the last-minute activities). This arrangement may scale better because only a subset of users are expected to generate journal requests at any given time. However, there may be a delay in providing appropriate journal responses to users because of the order of computations involved.

As with obtaining activity data from the UE devices, journal request/response messaging between the UE devices 102-1 to 102-N and JAPP server node 120 may be effectuated using a variety of communication technologies and interfaces, involving suitable UE hardware and/or software modalities. For instance, a content journal application client program (also referred to as "playback" client application), may be provided with the UE device that may be launched by a user for sending a journal request with appropriate parameters. In another variation, an "app" may be made available as part of the UE device software whose icon may be selected for sending a journal request. In a still further variation, a hardware modality associated with the UE device such as a set of keystrokes, programmable buttons, etc. may be coded to execute journal requests. In the example network architecture 100 of FIG. 1, a journal request 122 generated from UE device 102-1 and a journal response message 124 from JAPP server node 120 containing data for presentation as a timeline-based journal are exemplary of such interactions via a suitable network 113. A skilled artisan will recognize upon reference hereto that although networks 105, 113 are shown as separate entities in FIG. 1, they may be formed as a single network infrastructure coupled to the core/service network 109. Further, the subscriber activity data may be hosted either on the individual UE devices executing the playback client or on the servers. However, in order to enable a multi-screen journal experience, it is necessary that this data is made available on the server(s). If the data is hosted only on the playback client device, the experience will be limited to the playback and browsing history on that client device itself.

Figure 2A:
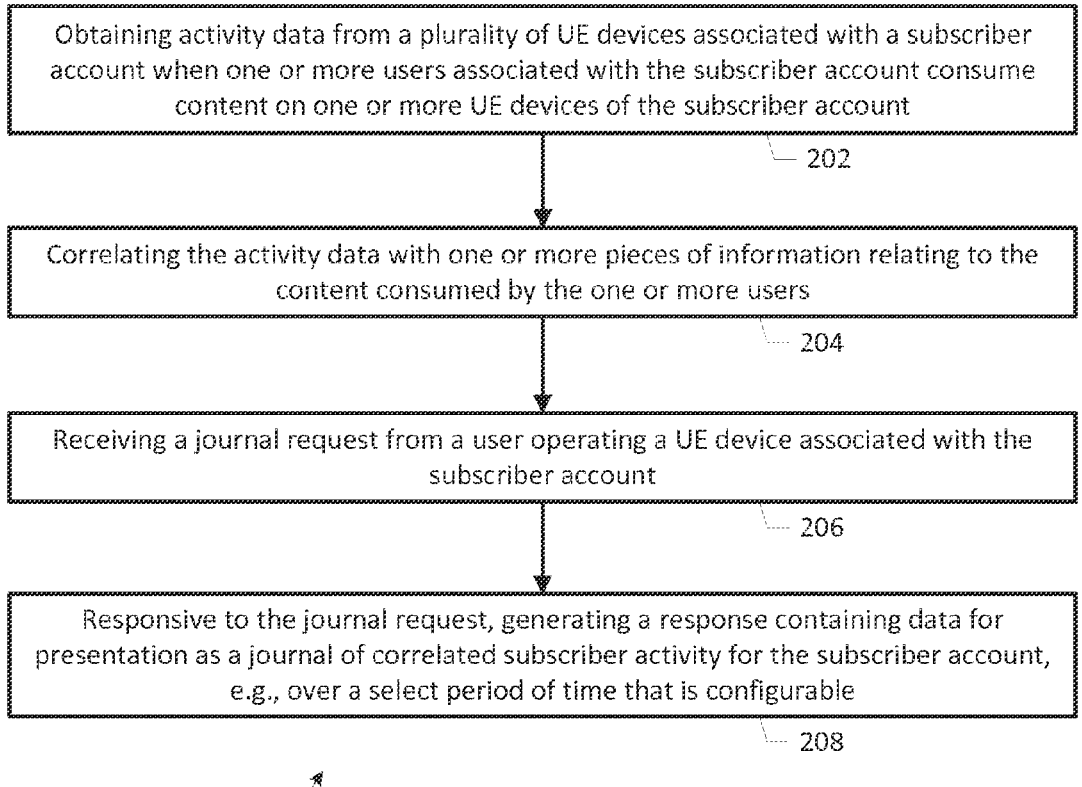
FIGS. 2A and 2B depict flowcharts of various blocks, steps, acts and/or functions that may take place at one or more network nodes, operating either together or separately, for providing content consumption journal information to a user in an implementation of the network architecture of FIG. 1.
Figure 2B:
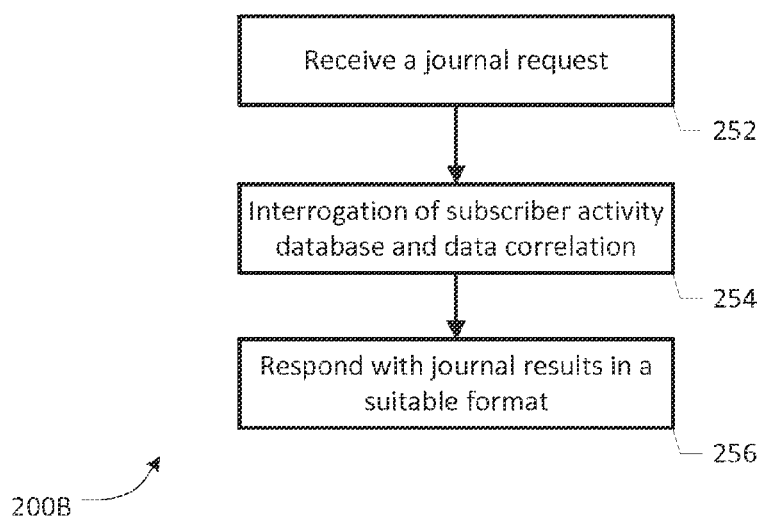

FIGS. 2A and 2B depict flowcharts of various blocks, steps, acts and/or functions that may take place at one or more network nodes, operating either together or separately, for providing content consumption journal information to a user in an implementation of the network architecture of FIG. 1. Reference numeral 200A refers to an overall scheme for providing content consumption data to users in a multi-device environment. At block 202, activity data from a plurality of UE devices associated with a subscriber account is obtained when one or more users associated with the subscriber account consume content on one or more UE devices of the subscriber account. At block 204, the activity data is correlated with one or more pieces of information relating to the content consumed by the one or more users. At block 206, according to an embodiment, a journal request is received from a user operating a UE device associated with the subscriber account. Responsive to the journal request, a response is generated that contains data for presentation as a journal of correlated subscriber activity for the subscriber account over a select period of time (block 208). It should be appreciated that for some services, in certain situations, e.g., often linked with restrictions from content providers, the operator can require the users to register their devices as well. By registering the device, the user could label it with a friendly name, which would show on the content journal. If the device is not registered, then the device ID will likely be displayed (e.g., a MAC address or a serial number, etc.).

An embodiment of a process 200B that may be executed at a JAPP server node is set forth in FIG. 2B. At block 252, a journal request is received from a user operating a UE device associated with a subscriber account. As pointed out previously, an example journal request includes at least one of an account identity (ID), a user ID and a UE device ID. Responsive to processing the journal request (block 252), the JAPP server node is configured to interrogate a subscriber activity database and/or trigger a data analytics platform associated therewith to obtain journal data (block 254) for the subscriber account over a select period of time, wherein the journal data is based on activity data obtained from a plurality UE devices associated with the subscriber account when one or more users consume content on the UE devices and correlated with one or more pieces of information relating to the consumed content. At block 256, the JAPP server node provides the journal data to the user in a suitable response message for presentation at the UE device in a format for facilitating navigation by the user, as will be described in further detail below.

Figure 3:
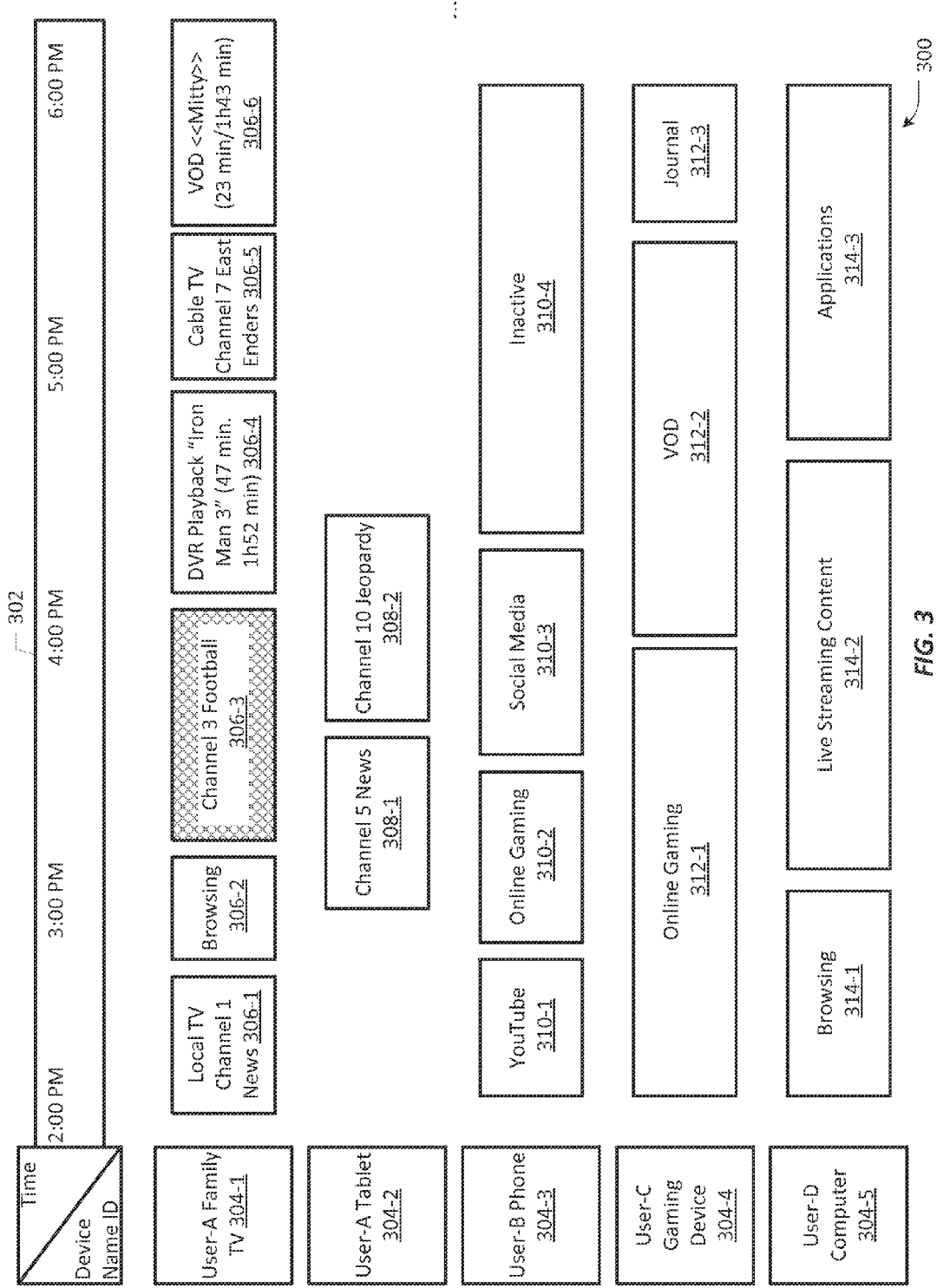
FIG. 3 is representative of an example subscriber activity data record or content consumption journal for presentation to a user according to an embodiment.

FIG. 3 is representative of an example subscriber activity data record or content consumption journal 300 for presentation to a user according to an embodiment. It will be recognized that when the content consumption journal 300 is accessed on any UE client device, it may be presented in a variety of grid formats adapted for display on a screen, e.g., on a TV, a tablet, a computer's display monitor, a portable gaming console, a smartphone, etc. In one variation, the format may comprise a row of activities shown per UE device over a select period of time. In another variation, the format may comprise a row of activities shown per user over a select period of time. In another variation, the format of journal data can be presented in a grid form showing different content assets consumed by the users on one or more UE devices associated with the subscriber account. In a still further variation, content consumption data may be presented in "playback" lists, with applicable time slots corresponding to the events, wherein an entry in the list can be selected for playback. Clearly, a number of additional variations can be obtained for journal presentation in a configurable, navigation-friendly interface.

Example journal presentation 300 shows various content consumption activities on a plurality of devices, TV 304-1, Tablet 304-2, Phone 304-3, Gaming Device 304-4 and Computer 304-5, associated with a subscriber account that is established for four users, User-A to User-D. One of the users, e.g., User-A, may be identified as the account owner (i.e., master user with appropriate privileges). Activities on each device are shown in a timeline 302, where each program or event may be demarcated as a time slot depending on how long that program was watched or consumed on that device. For example, a sequence of content consumption activities on TV 304-1 comprises watching a local TV channel 1 306-1, browsing 306-2 (which may represent accessing the Internet via TV 304-1 and surfing the web, as well as browsing/searching for content, i.e., navigation, for example), and followed by watching a sports program 306-3 that may be subject to playback/DRM constraints. The TV activity thereafter comprises playback of a DVR program 306-4, watching a cable TV channel 306-5, followed by watching a VOD content 306-6. Likewise, consumption of content via Tablet 304-2 by User-A is shown as a sequence of watching news 308-1 followed by watching a TV network program 308-2. Where there is a blank in a timeline with respect to a particular device, it may be indicative of inactivity on that device. In some implementations, an inactive slot may be expressly shown in a journal presentation, e.g., inactive period 310-4 for Phone 304-3 that is associated with User-B, which inactive period follows social media activity 310-3. As illustrated, activities on Phone 304-3 for the applicable timeline start with YouTube activity 310-1 followed by online gaming activity 310-2 that precedes social media activity 310-3. In similar fashion, activities on Gaming Device 304-4 associated with User-C comprise online gaming 312-1, watching VOD content 312-2, and subsequently followed by journal activity 312-3 (e.g., activities undertaken by User-C to access the journal and managing any settings, profiles, etc. associated therewith, assuming such privileges are available to User-C). Activities on Computer 304-5 associated with User-D comprise browsing 314-1, live streaming of content 312-2, and applications activity 314-3.

In another variation, an example journal presentation may also include a Picture-in-Picture (PIP) window displayed on the screen (especially for trick modes), highlighting the content currently being selected in the content journal. This could be useful to display the content as well as the VOD posters, or program art linked with DVR recordings. When necessary, this window could be used to play the content in reduced size, so that the user can search for the exact moment to start playback. It could also be used to go over the navigation activity and stop at an exact moment of interest. As an example scenario, using a remote control device, the user would navigate with the arrow buttons to focus on different activities. Posters, program art or any visual aid would be displayed in the PIP window. Using another key or button on the remote control device, the user could either fast forward in the content, or go step-by-step in the navigation activity. Thereafter, when pressing Play button, a playback would be triggered. On a touch-sensitive device such as a tablet, the selection/navigation would be different but the same visual layout including a PIP window could be presented as well.

As part of navigation-friendly interfacing, journal 300 allows for navigation by a user using suitable means (e.g., swiping on a touch-sensitive screen, rolling a pointing device or mouse, scrolling keys, etc.) to select a previously consumed content for playback. When selecting an event, the user could be invited either to browse a related information page or tab, start/resume its playback, or take other actions such as rating and sharing with other users. When playback of an unrestricted event is started, content may be requested from VOD servers, time-shift servers, NPVR/DVR storage or local DVR storage, depending on the system configuration and capabilities. As noted above, some of the activities may pertain to accessing controlled content assets, e.g., programs having restrictions with respect to playback. Activity slots for such assets may be provided with an indicator or marker to indicate that they cannot be accessed again for playback unless approved or cleared by an authentication portal. For example, a DRM portal that implements a paywall requiring payment or subscription for purchase of the content may be provided in order to (re)access and play back the content. Further, such indicators or markers may comprise providing differently colored or shaded time slots corresponding to the activity data. By way of illustration, the sports program 306-3 shown above may be an event that was watched but cannot be played back on the device from which the journal is accessed. When selecting this program, the user could be shown an information page and further instructions on how to access this content if it is available on another device. Further, depending on content rights, the content could be watched on TV only, or only within the home network, etc. As one skilled in the art will appreciate, operators are not only contractually obligated to their content providers for enforcing such rules, but they can also set their own business logic and service rules. Additionally, local parental control rules can restrict content access for specific users (e.g., children) during dedicated time slots. If the user is a master user of the account (e.g., household account owner), the master user may be configured with privileges to access the journal and view the activity of other users on their UE devices. A typical use case would be where parents can check what their children watched on TV and their respective devices while they were alone or in controlled environments (e.g., study groups, play dates, etc.).

Figure 4:
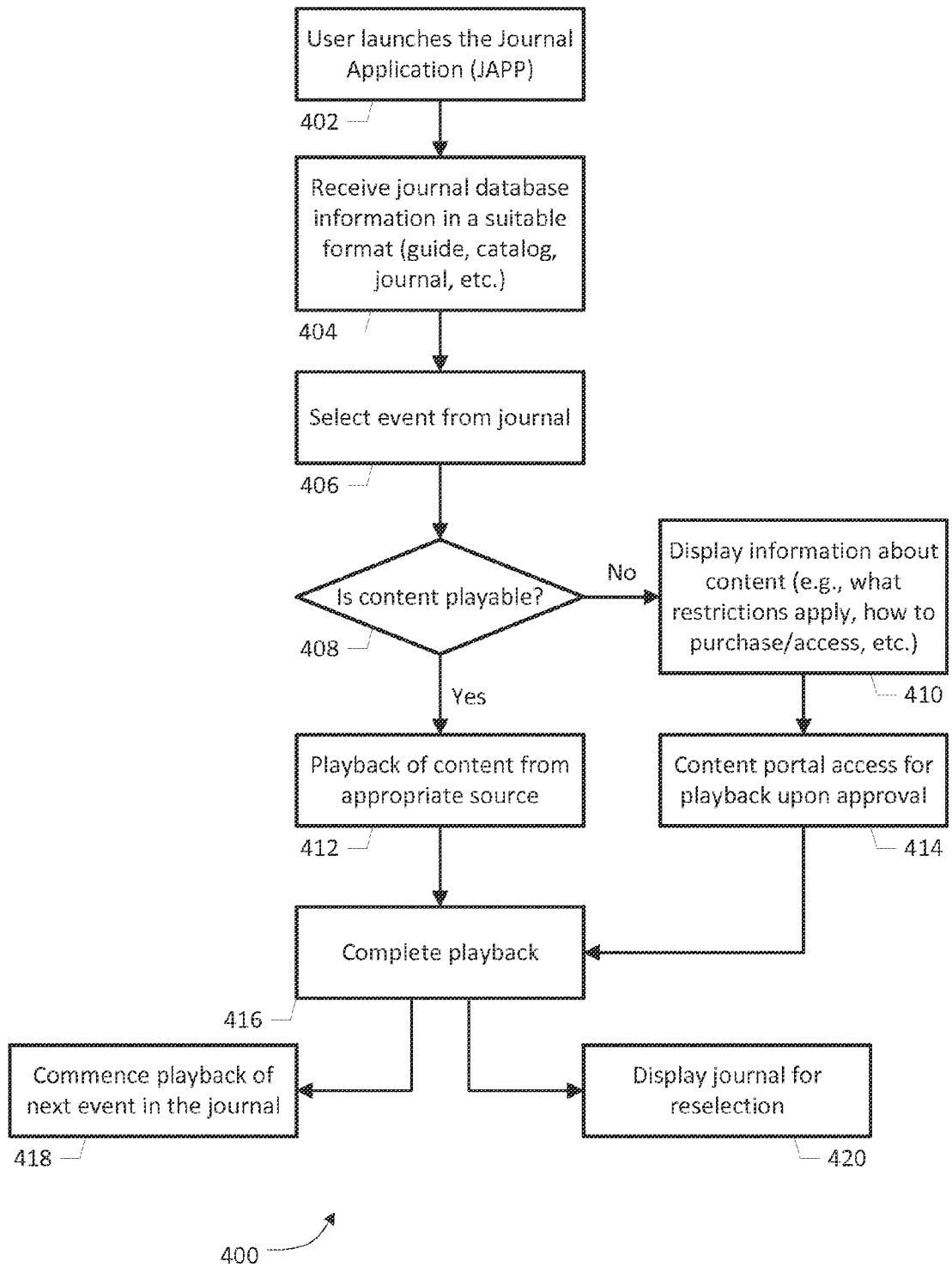
FIG. 4 is a flowchart of an example method of user interaction with a content consumption journal according to an embodiment.

Turning to FIG. 4, shown therein is a flowchart of an example user interaction process 400 with a content consumption journal according to an embodiment. At block 402, the user launches the content consumption journal application on a UE device as described above, whereupon appropriate journal data is received by the UE device for display in a suitable format (e.g., an EPG, catalog, etc.) on a screen associated therewith (block 404). In one implementation, the user interface may be configured to display a backwards EPG starting with the last event played back. The user interface is also operative to facilitate interaction by the user, allowing the user to navigate through the displayed EPG for selecting an event that was previously watched or consumed (block 406). Depending on the device on which the program is selected, and/or also based on business rules (geo-location, content rights, time of day, etc.) and the user profile, the content may or may not be playable on the device, as may be determined by decision block 408. If the content is not playable, the user can be shown a page (or a link therefor) with further information such as, e.g., the reason(s) as to why the content cannot be played back, or under which conditions it can be accessed (block 410). Upon satisfying a paywall portal or other suitable DRM authentication rules, the user may be allowed to commence playback the selected content (block 414). If the content is playable, playback can start upon selecting the event, and content is requested from the appropriate source (e.g., a suitable "catch-up" content portal, NDVR, local DVR, VOD, etc.), as set forth at block 412. For example, the user can resume content when she last stopped the playback, or restart from the beginning. Trick modes can also be enabled based on business rules. Upon completion of playback of content (free or purchased), the user may be allowed to proceed to playing back the next event in the journal, as set forth at blocks 416, 418. Alternatively, the user may be presented with the journal again for possible navigation and (re)selection by the user (block 420).

It should be appreciated that as all user activity is logged and can be retrieved on any device, it is possible for the user to recall all pages that were previously displayed. For example, by selecting the browsing activity 306-2 in FIG. 3, the user can be shown a list of pages that were accessed during that time slot. This can be used to quickly find again content that the user was interested in. In reference to online gaming activities, the journal may present the user with all the keystrokes, selected options, rules, strategies, avatar settings, etc. engaged by the user while playing the game online. With respect to trick modes, if a user rewinds the content beyond the start of the event, the operator can choose to rewind further to the previous event (which could be played back from another source), or to stop the rewind at the beginning of the event. Similarly, when the playback reaches the end of the event, the operator can choose to continue with the playback of the next event (which could be played back from another source), or end the playback to save the network resources if the content originates from the network (e.g., VOD, NPVR/DVR, TSTV, etc.). When "cross-events" trick modes are enabled (e.g., rewinding beyond the boundary of an activity slot, or forwarding past the current activity slot, etc.), one embodiment of the system may be configured such that "browsing" events (e.g., browsing 306-2, browsing 314-1, etc. shown in FIG. 3) in the journal are ignored and not displayed during rewind and fast-forward operations.

Figure 5:
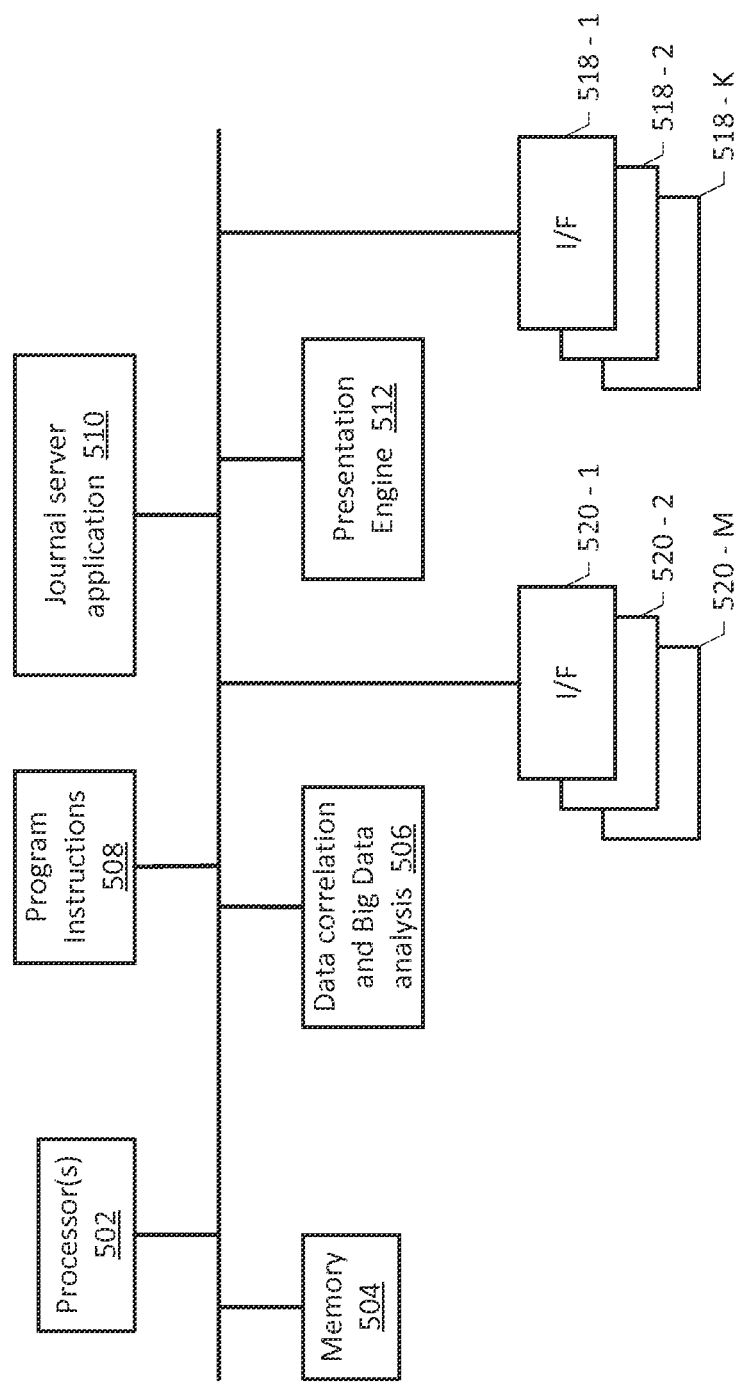
FIG. 5 depicts a block diagram of an example journal server node for operation in an implementation of the network architecture of FIG. 1.

FIG. 5 depicts a block diagram of an example journal server node 500 for operation (e.g., as JAPP server node 120) in an implementation of the network architecture of FIG. 1. One or more processors 502 may be operatively coupled to various modules that may be implemented in persistent memory for executing suitable program instructions or code portions with respect to one or more processes set forth hereinabove for servicing journal requests from users associated with a subscriber account. A journal server application 510 is operative with a local data correlation/analytics module 506 or a remote/distributed platform (not specifically shown) for processing a journal request including various parameters such as account ID, user ID, device ID, and other variables as discussed hereinabove. Appropriate interfaces (I/F) 520-1 to 520-M are operative to effectuate request/response messages to and from UE devices, and may include wireless and wireline interfaces. Likewise, appropriate interfaces 518-1 to 518-K to various network elements and/or nodes (e.g., subscriber activity databases, distributed data analytics platforms, activity logging servers, as well as other content-related information databases, etc.) may be provided in an example network node implementation. Special purpose program instructions 508 and/or other code stored in suitable memory modules 504 are operative in conjunction with the server application 510 to interrogate a subscriber activity database to obtain correlated journal data for a subscriber account identified in the journal request. A presentation engine 512 is operative to manage or otherwise manipulate the correlated journal data for presentation suitable to the requesting UE device in a navigation-friendly format via one of the UE interfaces 520-1 to 520-M. It should be appreciated that one or more modules or blocks set forth herein may be embodied in a persistent memory operative in conjunction with suitable program instructions 508.

Figure 6:
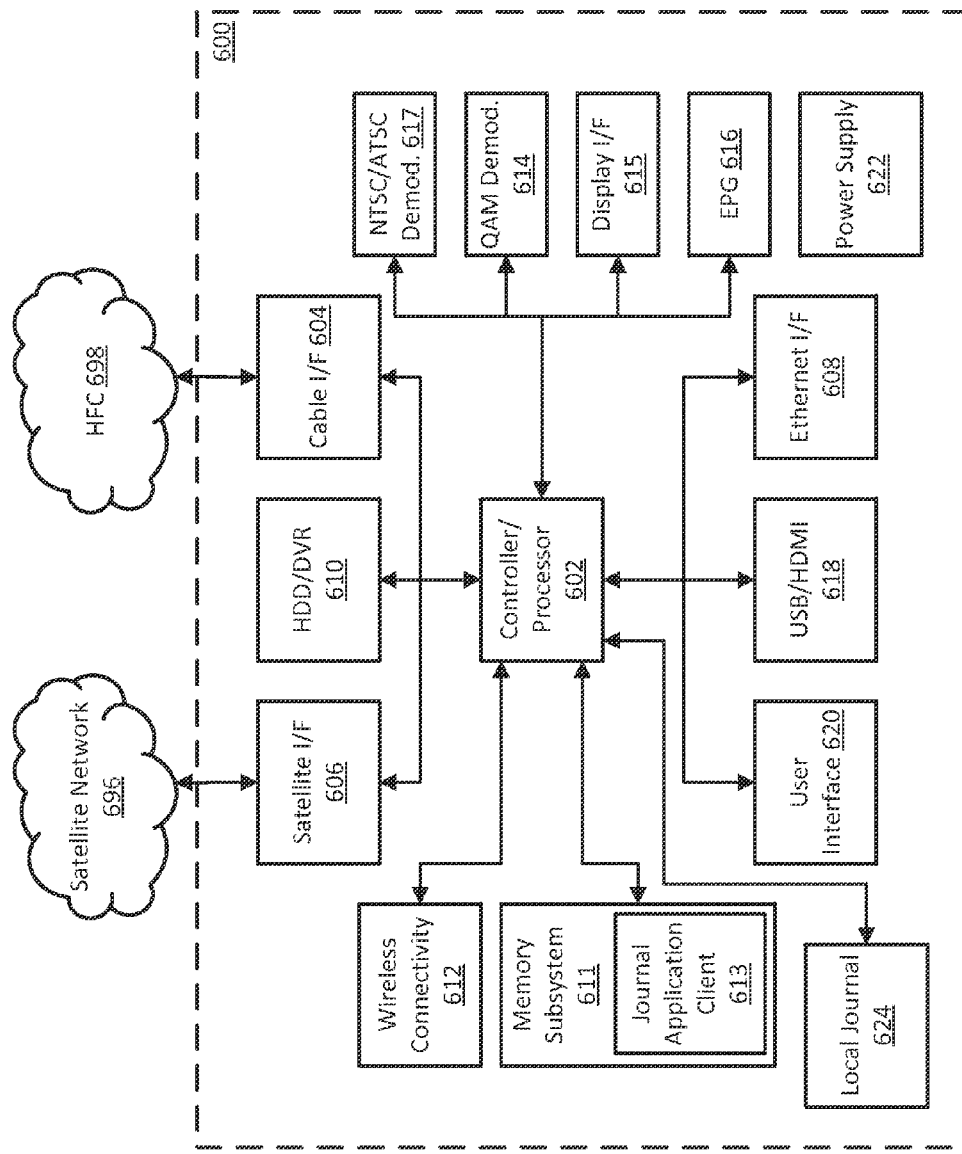
FIG. 6 depicts a block diagram of an example UE device according to an embodiment of the present patent application.

FIG. 6 depicts a block diagram of an example subscriber end station or UE device 600 according to an embodiment of the present patent application. End station 600 is generally representative of UE devices 102-1 to 102-N associated with a subscriber account as exemplified in the network architecture 100 of FIG. 1, and may include appropriate hardware/software components and subsystems configured for performing any of the device-side processes (either individually or in any combination thereof) with respect to generating journal requests and receiving appropriate responses described hereinabove. One or more microcontrollers/processors 602 are provided for the overall control of the UE device 600 and for the execution of various stored program instructions embodied in a persistent memory 613 as a journal application client that may be part of a memory subsystem 611 of an example embodiment of the UE device 600. In another variation, a journal application client may be provided as a plug-in or an application within a browser, e.g., an HTML5 application executed within a browser. Controller/processor complex referred to by reference numeral 602 may also be representative of other specialty processing modules such as graphic processors, video processors, digital signal processors (DSPs), and the like, operating in association with suitable video and audio interfaces (not specifically shown). Where applicable, appropriate interfaces such as cable TV I/F modules 604 and/or satellite TV I/F modules 606 involving tuners, demodulators, descramblers, MPEG/H.264/H.265 decoders/demuxes may be included for processing and interfacing with TV and other content signals received via an HFC cable network 698 or a satellite network 696. In a TV implementation, example demodulators may include QAM demodulator 614 and NTSC/ATSC demodulator 617. Other I/O or interfaces such as a display interface 615, Electronic Program Guide (EPG) 616, user interface 620, USB/HDMI ports 618, Ethernet I/F 608, and short-range and wide area wireless connectivity interfaces 612 are also provided. A hard disk drive (HDD) or DVR system 610 is provided for mass storage of all sorts of program assets such as NV media, TV shows, movie titles, multimedia games, etc. Also included in the subscriber UE device 600 is a suitable power supply block 622, which may include AC/DC power conversion to provide power for the device 600. It should be appreciated that the actual power architecture for the subscriber device 600 may vary by the hardware platform used, e.g., depending upon the core SoC (System on Chip), memory, analog front-end, analog signal chain components and interfaces used in the specific platform, and the like. In an embodiment where subscriber activity data is locally hosted, a local journal database 624 may also be provided that allows for display of local playback and browsing history on the UE device 600.

Based upon the foregoing Detailed Description, it should be appreciated that one or more embodiments of the present disclosure can be advantageously implemented in a variety of multi-device environments for effectuating a system and method to help end users recall all the content (or any portion thereof) that they browsed through and played back on any device (i.e., cross-device journaling). Further, embodiments herein provide a method to highlight past content that cannot be played back in "catch-up" mode, preferably based on the user, device and business rules. Additional embodiments provide a method to help parents check on how much time their children have been watching TV (on any device), and the nature of the content they actually watch. Additionally, one of the advantages of an embodiment of the present invention is to enable the user to find content that she may have been interested with, even though she did not start playback In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

As alluded to previously, tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process. Accordingly, embodiments of the present invention may be embodied in hardware and/or in software (including firmware, resident software, micro-code, etc.) that runs on a processor or controller, which may collectively be referred to as "circuitry," "a module" or variants thereof. Further, an example processing unit may include, by way of illustration, a general purpose processor, a special purpose processor, a conventional processor, a signal processor such as DSP, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. As can be appreciated, an example processor unit may employ distributed processing in certain embodiments.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Furthermore, although some of the diagrams include arrows on communication paths to show a primary direction of communication, it is to be understood that communication may occur in the opposite direction relative to the depicted arrows. Finally, other blocks may be added/inserted between the blocks that are illustrated.

It should therefore be clearly understood that the order or sequence of the acts, steps, functions, components or blocks illustrated in any of the flowcharts depicted in the drawing Figures of the present disclosure may be modified, altered, replaced, customized or otherwise rearranged within a particular flowchart, including deletion or omission of a particular act, step, function, component or block. Moreover, the acts, steps, functions, components or blocks illustrated in a particular flowchart may be inter-mixed or otherwise inter-arranged or rearranged with the acts, steps, functions, components or blocks illustrated in another flowchart in order to effectuate additional variations, modifications and configurations with respect to one or more processes for purposes of practicing the teachings of the present patent disclosure.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. A method for providing content consumption data to users in a multi-device environment, the method comprising:

obtaining activity data from a plurality of user equipment (UE) devices associated with a subscriber account when one or more users associated with the subscriber account consume content on one or more UE devices of the subscriber account over multiple network infrastructures using broadcast cable TV, local TV, switched digital video (SDV) TV, satellite TV, broadband Internet, and one or more adaptive bitrate (ABR) streaming networks;

correlating the activity data with one or more pieces of information relating to the content consumed by the one or more users based on an account identity associated with the subscriber account;

receiving a journal request from a user operating a particular UE device associated with the subscriber account, the journal request including a user-configurable period of time for which the user wishes to access the activity data;

responsive to the journal request, generating a response to the user containing data for presentation as a journal of correlated subscriber activity for the subscriber account over the user-configurable period of time;

receiving an indication from the user operating the particular UE device to play back a content program started by another user operating another UE device; and responsive to the indication, effectuating a playback session of the content program on the particular UE device.

2. The method as recited in claim 1, wherein the correlating the activity data is performed in real-time upon receiving the journal request.

3. The method as recited in claim 1, wherein the correlating the activity data is performed periodically in batch mode prior to receiving the journal request.

4. The method as recited in claim 1, wherein the correlating the activity data is performed using a MapReduce programming platform.

5. The method as recited in claim 1, wherein the activity data is obtained from the UE devices based on pushing by the UE devices to a data logging service node.

6. The method as recited in claim 1, wherein the activity data is obtained from the UE devices based on pulling the activity data by a data logging service node.

7. The method as recited in claim 1, wherein the activity data and one or more pieces of information relating to the content consumed by the one or more users associated with the subscriber account comprises at least one of the account identity (ID), user identities (IDs) of users associated with the subscriber account, device identities (IDs) of the UE devices, television (TV) channel tuning information including channel ID and tuning time, Video-on-Demand (VOD) asset identity (ID) information, video quality information, content purchase pricing information, VOD asset playback start time, VOD asset playback end time, VOD asset playback status information, digital video recorder (DVR) content identity (ID), DVR content playback time, DVR content playback end time, trick mode information, parental control information including personal identification number (PIN) associated with a user designated as a subscriber account holder of the subscriber account, Internet browsing information including web page location information, streaming program identity (ID), user browsing navigation information, and power state information pertaining to the UE devices.

8. The method as recited in claim 1, wherein the UE devices comprise one or more TVs, smartphones, tablets, laptop computers, desktop computers, phablet devices, Internet appliances, video gaming devices, Internet-connected home entertainment systems, and video streaming devices.

9. The method as recited in claim 1, wherein the journal request includes at least one of the account ID, a user ID, and a UE device ID.

10. A system for facilitating content consumption across multiple users and devices in a multi-device environment, the system comprising:
  one or more processors; and
  a persistent memory module coupled to the one or more processors, wherein the persistent memory module includes program instructions which, when executed by the one or more processors, are configured to perform:
    obtaining activity data from a plurality of user equipment (UE) devices associated with a subscriber account when one or more users associated with the subscriber account consume content on one or more UE devices of the subscriber account over multiple network infrastructures using broadcast cable TV, local TV, switched digital video (SDV) TV, satellite TV, broadband Internet, and one or more adaptive bitrate (ABR) streaming networks;
    correlating the activity data with one or more pieces of information relating to the content consumed by the one or more users based on an account identity associated with the subscriber account;
    receiving a journal request from a user operating a particular UE device associated with the subscriber account, the journal request including a user-configurable period of time for which the user wishes to access the activity data;
    responsive to the journal request, generating a response to the user containing data for presentation as a journal of correlated subscriber activity for the subscriber account over the user-configurable period of time;
    receiving an indication from the user operating the particular UE device to play back a content program started by another user operating another UE device; and
    responsive to the indication, effectuating a playback session of the content program on the particular UE device.

11. The system as recited in claim 10, wherein the program instructions for correlating the activity data comprise instructions for performing correlation of the activity data in real-time upon receiving the journal request.

12. The system as recited in claim 10, wherein the program instructions for correlating the activity data comprise instructions for performing correlation of the activity data periodically in batch mode prior to receiving the journal request.

13. The system as recited in claim 10, wherein the program instructions for correlating the activity data comprise instructions for performing correlation of the activity data using a MapReduce programming platform.

14. The system as recited in claim 10, wherein the activity data is obtained from the UE devices based on pushing by the UE devices to a data logging service node.

15. The system as recited in claim 10, wherein the activity data is obtained from the UE devices based on pulling the activity data by a data logging service node.

16. The system as recited in claim 10, wherein the activity data and one or more pieces of information relating to the content consumed by the one or more users associated with the subscriber account comprises at least one of the account identity (ID), user identities (IDs) of users associated with the subscriber account, device identities (IDs) of the UE devices, television (TV) channel tuning information including channel ID and tuning time, Video-on-Demand (VOD) asset identity (ID) information, video quality information, content purchase pricing information, VOD asset playback start time, VOD asset playback end time, VOD asset playback status information, digital video recorder (DVR) content identity (ID), DVR content playback time, DVR content playback end time, trick mode information, parental control information including personal identification number (PIN) associated with a user designated as a subscriber account holder of the subscriber account, Internet browsing information including web page location information, streaming program identity (ID), user browsing navigation information, and power state information pertaining to the UE devices.

17. The system as recited in claim 10, wherein the journal request is received from a user operating a particular UE device comprising at least one of a TV, a smartphone, a tablet, a laptop computer, a desktop computer, a phablet device, an Internet appliance, a video gaming device, an Internet-connected home entertainment system, and a video streaming device.

18. The system as recited in claim 10, wherein the journal request includes at least one of the account ID, a user ID, and a UE device ID.

* * * * *